United States Patent

Lajiness

[11] Patent Number: 6,094,160
[45] Date of Patent: Jul. 25, 2000

[54] INTERFERENCE REJECTION METHOD FOR AN AUTOMOTIVE RADAR CW/ICC SYSTEM

[75] Inventor: Gregory George Lajiness, Tucson, Ariz.

[73] Assignee: Delco Electronics Corp., Kokomo, Ind.

[21] Appl. No.: 09/329,642

[22] Filed: Jun. 10, 1999

[51] Int. Cl.[7] .................................................. G01S 13/93
[52] U.S. Cl. ............................ 342/70; 342/159; 342/162
[58] Field of Search .................................. 342/70, 71, 72, 342/159, 161, 162, 174, 189, 195, 203, 59, 91, 93

[56] References Cited

U.S. PATENT DOCUMENTS

| | | | |
|---|---|---|---|
| 4,703,358 | 10/1987 | Flannaghan | 348/700 |
| 4,704,736 | 11/1987 | Kasser | 455/213 |
| 5,018,215 | 5/1991 | Nasr et al. | 382/155 |
| 5,554,955 | 9/1996 | Myers | 329/317 |
| 5,712,628 | 1/1998 | Phillips et al. | 340/10.51 |
| 6,011,507 | 1/2000 | Curran et al. | 342/70 |

FOREIGN PATENT DOCUMENTS

| | | | |
|---|---|---|---|
| 364001345A | 1/1989 | Japan | H04L 1/00 |
| 401011429A | 1/1989 | Japan | H04B 7/26 |
| 405037266A | 1/1989 | Japan | H03G 3/10 |

*Primary Examiner*—John B. Sotomayor
*Attorney, Agent, or Firm*—Jimmy L. Funke

[57] ABSTRACT

A method for rejecting system-to-system interference in a FLR system in which sampled data obtained from each channel of the FLR receiver is analyzed to recognize transient data due to interference with another FLR system and bounded in the time domain. The bounded data set is deleted and replaced with a new data set determined by interpolation. The transient data is recognized when the variance of a sliding window of samples exceeds a variance threshold. The method removes transient pulses with minimal distortion of the raw data, and the impact on system complexity and cost is minimal when the system already includes digital signal processing capability for other purposes.

6 Claims, 4 Drawing Sheets

INTERFERENCE REJECTION METHOD FOR AN AUTOMOTIVE RADAR CW/ICC SYSTEM

TECHNICAL FIELD

This invention relates to radar-based motor vehicle collision warning (CW) and/or intelligent cruise control (ICC) systems, and more particularly to a method of operation for rejecting system-to-system interference.

BACKGROUND OF THE INVENTION

Collision warning and intelligent cruise control systems generally employ a forward looking radar (FLR) sensor mounted at the forward end of the host vehicle for acquiring data corresponding to the range, range rate, and the azimuth angle of a target vehicle or other object. A microprocessor receives and analyzes the sensor data along with other data such as vehicle velocity, and predicts the likelihood of an impending collision. In a collision warning system, the primary function of the system is to warn the operator of a potentially unsafe operating condition, or possibly to initiate a corrective action, whereas in an intelligent cruise control system, the primary function is to adjust the vehicle speed to maintain a desired headway or following distance.

It has been recognized that proliferation of such radar-based systems increases the likelihood of system-to-system interference. A typical scenario is illustrated in FIG. 1A, which depicts three vehicles A, B and C travelling on a two-lane roadway 10. Vehicles A and B are travelling in the same direction, and vehicle A is equipped with an ICC system having a scanned, narrow beam, Frequency Modulated Continuous Wave (FMCW) FLR sensor, indicated by the beam 12 and the viewing angle 14. In the illustration, the ICC system is causing vehicle A to pace vehicle B at a controlled distance or range R. Vehicle C, travelling in the opposite direction, is equipped with a fixed, wide beam (or multiple fixed beam), Continuous Wave (CW) FLR sensor, as indicated by the beam 16. The FLR systems in vehicles A and C each receive and process time-delayed reflections of their respective transmitted waveform to determine the range and velocity of potential targets, but in certain cases, the two transmitted waveforms are close enough in frequency to be received as a reflected signal. Exemplary waveforms of the vehicles A and C are graphically depicted in FIG. 1B, where the FMCW and CW waveforms are designated by the traces 20 and 22, respectively. When the waveforms periodically coincide in frequency (i.e., at times $t_1$, $t_2$, $t_3$, $t_4$), the FLR receiver in vehicle A will output a short duration transient pulse in the time domain, as designated by the reference numeral 18 in FIG. 1C, which graphically depicts the I and Q outputs of a quadrature FLR receiver over a number of samples.

Various techniques have been proposed for mitigating the effects of the system-to-system interference described above. For example, it has been proposed to selectively polarize the transmitted waveforms, or to provide multiple beams with adaptive nulling between beams, or to use spread spectrum waveforms. In general, however, these techniques require undesirable system level tradeoffs and/or significantly increase system cost and complexity.

SUMMARY OF THE INVENTION

The present invention is directed to an improved technique for rejecting system-to-system interference in a FLR system which does not significantly increase system cost or complexity. In accordance with the invention, the receiver of the FLR system is equipped with a digital signal processor that analyzes the sampled data obtained from each channel of the receiver to recognize transient data due to interference with another FLR system, bound the transient in the time domain, delete the samples within the bounds and replace the deleted data set with a new data set determined by interpolation. Preferably, the transient data is recognized when the variance of a sliding window of samples exceeds a variance threshold. The technique serves to remove transient pulses with minimal distortion of the raw data, and the impact on system complexity and cost is minimal when the system already includes digital signal processing capability for other purposes.

BRIEF DESCRIPTION OF THE DRAWINGS

The present invention will now be described, by way of example, with reference to the accompanying drawings, in which:

FIG. 1A depicts the vehicles, FIG. 1B depicts a pair of conflicting FLR waveforms generated in the scenario, and FIG. 1C depicts an example of system-to-system interference in a sampled FLR receiver channel.

FIG. 3 depicts a high level flow diagram, and FIG. 4 depicts a portion of the high level flow diagram in more detail.

DESCRIPTION OF THE PREFERRED EMBODIMENT

Figure 1A:
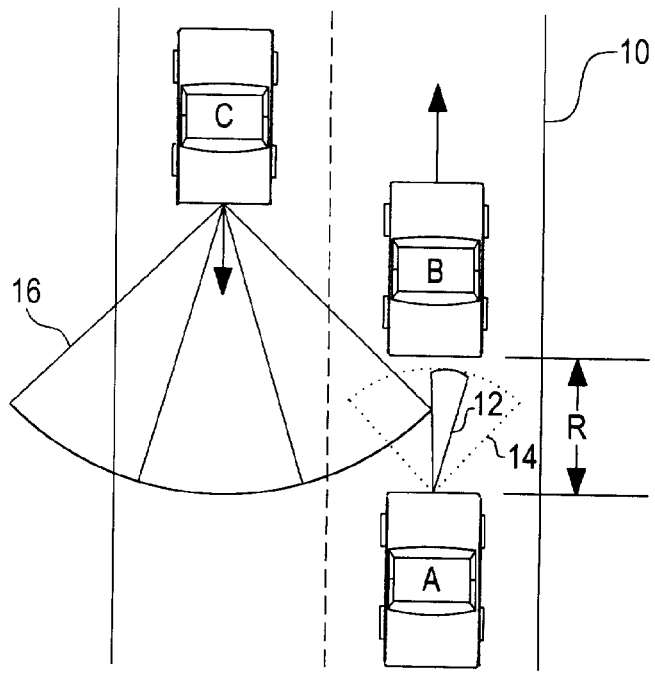
FIGS. 1A, 1B and 1C illustrate a typical driving scenario involving multiple FLR vehicles.
Figure 1B:
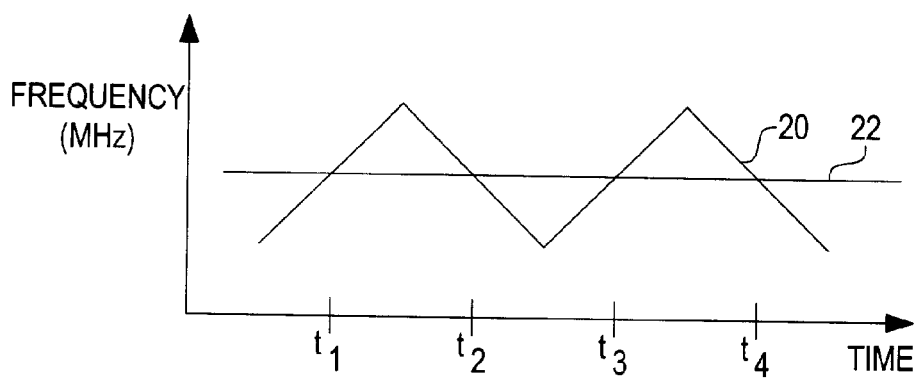
Figure 1C:
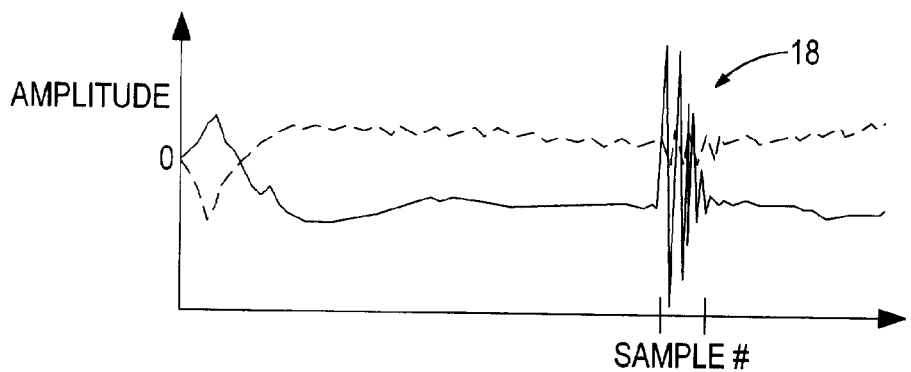
Figure 2:
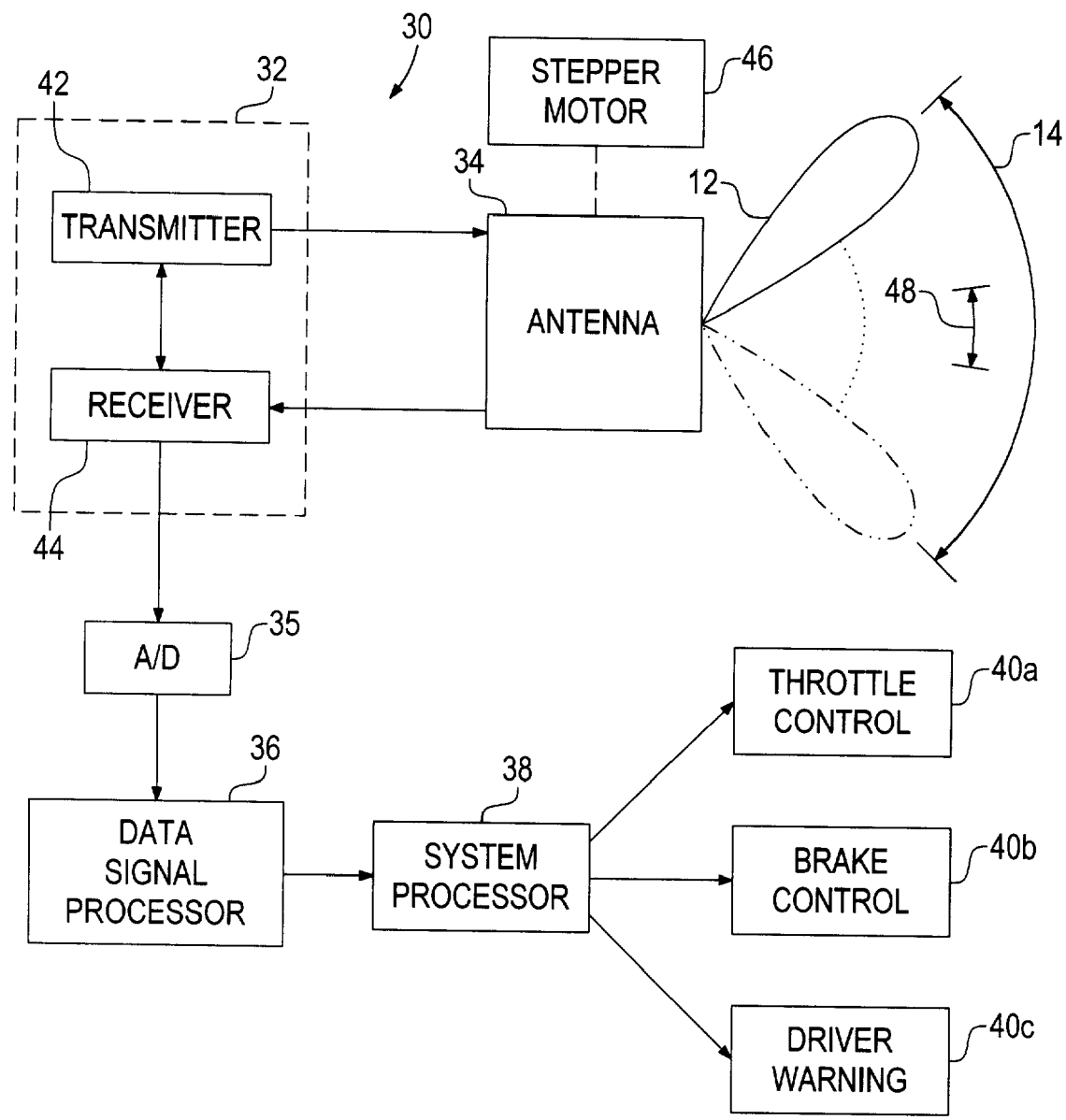
FIG. 2 is a block diagram of an automotive FLR system including a digital signal processor for identifying, removing and replacing transient data according to this invention.

Referring to the drawings, and particularly to FIG. 2, the reference numeral 30 generally designates a mechanically scanned narrow beam FMCW FLR system as generally described above in respect to vehicle A of FIG. 1A.

The system 30 includes a high frequency transceiver 32, an antenna 34, an analog-to-digital converter (A/D) 35, a signal processor 36, a system processor 38 and three different vehicle response systems 40a–40c. The transceiver 32 includes a transmitter 42 for coupling high frequency energy to the antenna 34, and a receiver 44 for receiving reflected energy returns from antenna 34 (or a separate receiver antenna) for analog-to-digital conversion by A/D 35 and subsequent processing by signal processor 36. The antenna 34 is designed to project a narrow energy beam 12 which is scanned in successive steps through a viewing angle 14 forward of the vehicle. In the illustrated embodiment, the antenna 34 is scanned in uniform increments of by a stepper motor 46 mechanically coupled to the antenna 34. However, the beam 12 may be scanned in non-uniform or different-sized increments, if desired. Additionally, it will be appreciated that other scanning mechanisms or electronic scanning may alternatively be utilized.

The digitized output channel(s) of the A/D converter 35 are passed on to digital signal processor 36, which analyzes the amplitude of the returns to identify any objects or targets within the viewing angle 14, and if possible, to characterize and resolve such objects as being either in or out of the vehicle travel path, represented by the smaller viewing angle 48 within the viewing angle 14. The system processor 38 receives the object information from signal processor 36, tracks the identified objects, and determines what, if any, vehicle response is appropriate. For example, if an identified object is determined to present only a minor risk of collision, an audible and/or visible driver warning, as represented by the vehicle response system 40c, may be appropriate. In a higher risk situation, the system processor 38 may choose to close the engine throttle, overriding the driver or cruise control system, as represented by the vehicle response system 40a. Alternatively or additionally, the system processor 38 may activate the vehicle brakes, as represented by the vehicle response system 40b. However, the nature and extent of vehicle response selected by the system processor 38 is beyond the scope of the present invention, which is directed to the operation of signal processor 36, and in particular, to the rejection of transients in the received data due to system-to-system interference.

In general, the control of this invention rejects interference-related transients in a three-step process involving (1) recognizing transient data due to interference with another FLR system, (2) bounding the transient in the time domain and deleting the data samples within the recognized bounds, and (3) replacing the deleted data set with a new data set determined by interpolation. These steps are described in general below.

The first step, recognizing transient data, is achieved by storing an array $A_K$ of N data samples from each receiver channel at each beam position K, analyzing a sliding window of M samples (where M<<N) within each array $A_K$ to determine sample variance S, and comparing the determined variance S to a variance threshold $T_S$. The presence of interference is identified when the variance S of the last M samples exceeds the variance threshold $T_S$.

The variance is defined in terms of the difference between the windowed samples $(X_i-X_M)$ and the mean $\mu$ of the windowed samples. Specifically, the mean $\mu$ and variance S are defined as follows:

$$\mu = 1 \bigg/ M \left[ \sum_{i=1}^{M} (X_i) \right] \quad (1)$$

$$S = 1 \bigg/ (M-1) \left[ \sum_{i=1}^{M} (X_i - \mu)^2 \right] \quad (2)$$

In a practical mechanization of this technique, the following values of N, M and $T_S$ were used: N=300, M=5 and $T_S$=2, with each sample $X_i$ being included in the variance calculations. In some applications where spectral weighting is used to suppress range side-lobes, it is possible to include only a portion of the samples in the variance calculations, thereby reducing the processing workload.

Once a transient is identified, the second step, bounding the transient in the time domain and deleting the data samples within the recognized bounds, is achieved by creating a sub-array $B_{i,K}$, where i is the (i)th recognized transient, and K is the beam position. For purposes of definition, the sub-array contains elements $b_j$, where j is less than N-1, and greater than or equal to zero. Each element $b_j$, corresponds to an element $a_w$ of the respective array $A_K$. The first element of the array $A_K$ at which a transient is detected is defined as the (g)th element, or $a_g$, so that g=w-j. For example, if a recognized transient starts with the $7^{th}$ element of an array $A_K$ (i.e, $a_7$), w=6, and j=0, meaning that the first element is stored in the sub-array for that beam position as $b_0$. Further, if the recognized transient ends with the twelfth element of the array $A_K$ (i.e, a, ), w=11, g=6, and j=5, meaning that the last element is stored in the sub-array for that beam position as $b_5$ (i.e., v=5) and the sub-array has a dimension D=6. In a preferred implementation, the dimension of the sub-array is expanded by two elements in each direction in order to ensure that the dataset associated with the recognized transient is completely captured; that is, the sub-array is defined as the elements starting with $a_{g-2}$ through $a_{v+2}$. Finally, the elements $b_j$ of the sub-array $B_{i,K}$ are removed or excised by setting them equal to zero.

Once the data samples (elements) associated with a recognized transient have been excised, the third and final step of developing a replacement data set is performed. This is achieved by estimating the slope of the unaffected data in the array $A_K$ and substituting a linear line segment in place of the excised data. Specifically, the slope m is defined as follows:

$$m=dy/dx, \text{ where} \quad (3)$$

$$dy=a_{v+3}-a_{g-3}, \text{ and} \quad (4)$$

$$dx=(v+3)-(g-3) \quad (5)$$

Thus, for the example given above where the recognized transient begins with the seventh element $a_6$ of the array $A_K$, and ends with the twelfth element $a_{11}$, so that the excised elements are bounded by $a_4$, $a_{13}$, the slope is defined as $(a_{14}-a_3)/11$. The estimated slope m is used to create new sub-array elements $b'_j$ by linear interpolation between the unaffected data samples. This can be expressed as:

$$b'_j=b_j+(a_{g-3}+m*t), \text{ for } t=1 \text{ to } (dx-1) \quad (6)$$

The new sub-array values are substituted in the respective array $A_K$, and normal processing of the stored data can proceed as normal. The replacement data results in minimal distortion of the raw data, and the impact on system complexity and cost is also minimal since the processor 36 is required for the remaining conventional process steps.

Figure 3:
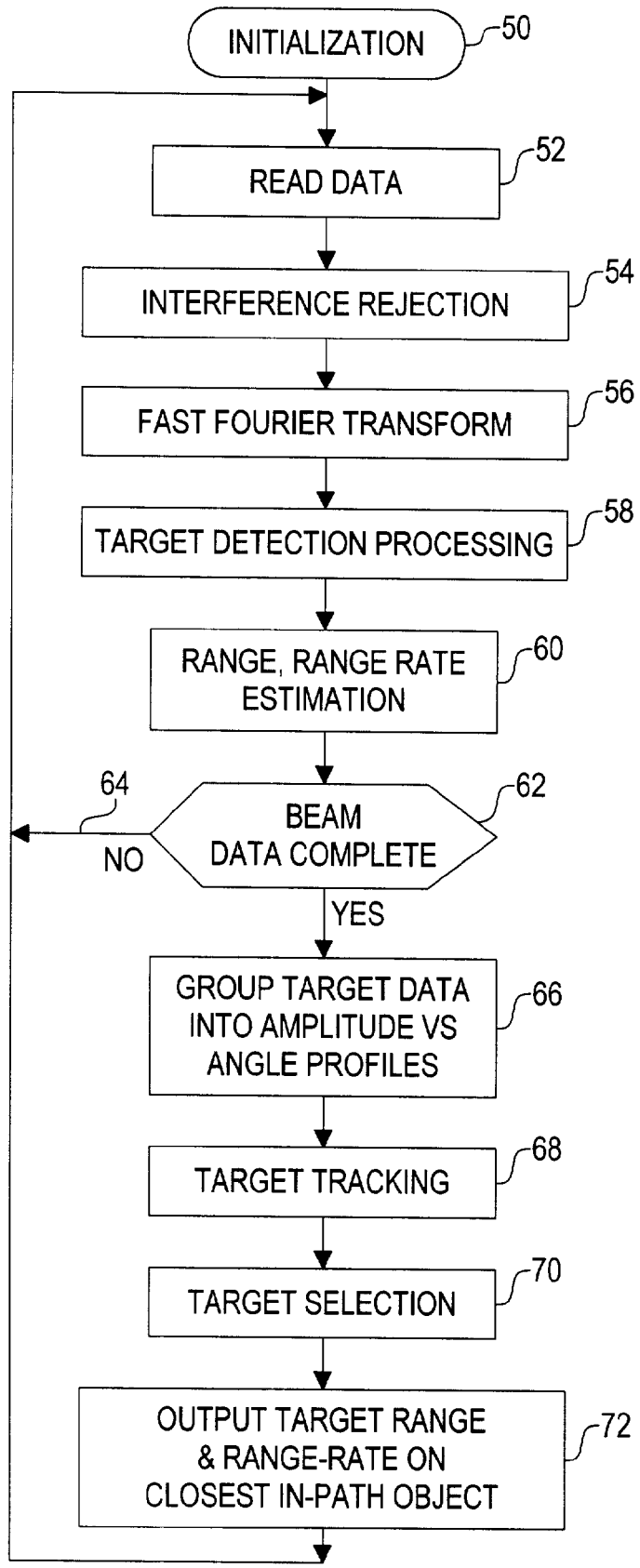
FIGS. 3 and 4 depict flow diagrams representative of computer program instructions executed by the signal processor of FIG. 2 in carrying out the method of operation of this invention.
Figure 4:
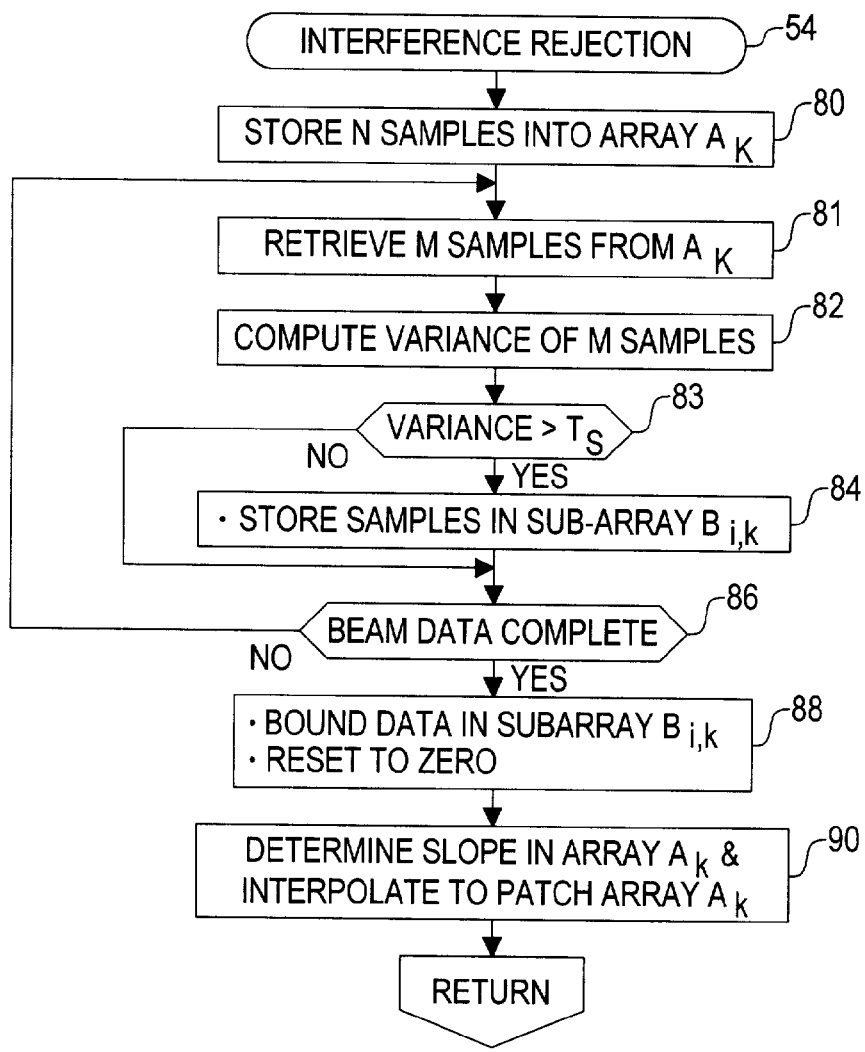

The flow diagrams of FIGS. 3–4 represent computer program instructions executed by the signal processor 36 of FIG. 2 in carrying out the method of this invention. FIG. 3 describes the operation of signal processor 36 in general, while FIG. 4 gives further detail in respect to the interference rejection of this invention.

Referring to FIG. 3, the block 50 designates initialization routine in which various parameters and variables used in the routine are initialized to predefined values and states. Following initialization, the processor 36 executes a series of processing steps identified by the blocks 52–60, including the interference rejection method of this invention (block 54) which are repeated for each beam position in a given scan, as indicated by the block 62 and return line 64. These processing steps include reading the return data received by receiver 44 (block 52), performing the interference rejection method of this invention (block 54), performing a fast fourier transform on the received data to form frequency and amplitude data for each beam position (block 56), processing the amplitude data to detect any potential targets in the viewing angle (block 58), and estimating range and range-rate parameters of any identified targets based on the fast fourier transform frequency and amplitude data (block 60).

After each of the return amplitude values for a given sweep of the viewing angle are acquired and processed, the block 66 is executed to group the amplitude data into amplitude vs. azimuth angle profiles, categorizing contiguous return data into groups of similar range and range rate within a given tolerance or window. Thereafter, the blocks 68–72 are executed to perform target tracking based on the range, range rate, angle and angle extent of each of the identified targets determined in block 66, to select the closest in-path target, and to output its range and range-rate data to the system processor 38. The system processor 38, in turn, analyzes the target data to determine what, if any, vehicle response is appropriate, as explained above.

The flow diagram of FIG. 4 details the steps involved in performing the interference rejection function of block 54. First, block 80 is executed to store N data samples into the array $A_K$, where K is the beam number. The first M successive samples from $A_K$ are identified in block 81. The variance of the M samples is calculated in block 82. If the variance S exceeds the threshold $T_S$, as determined at block 83, the (i)th transient is declared and the current M samples are stored in a sub-array $B_{i,K}$, as indicated at block 84. The next M samples are retrieved from array $A_K$ and the process is repeated until all N data samples in $A_K$ are processed. Each sub-array is then processed as indicated at blocks 88–90 to determine a bound for the sub-array samples, reset them to zero, determine the local slope of the $A_K$ array outside the determined bounds, and then substitute linearly interpolated data into the $A_K$ array. Thus, broadly speaking, the interference rejection involves steps of transient recognition, excision, and restoration.

Figure 5:
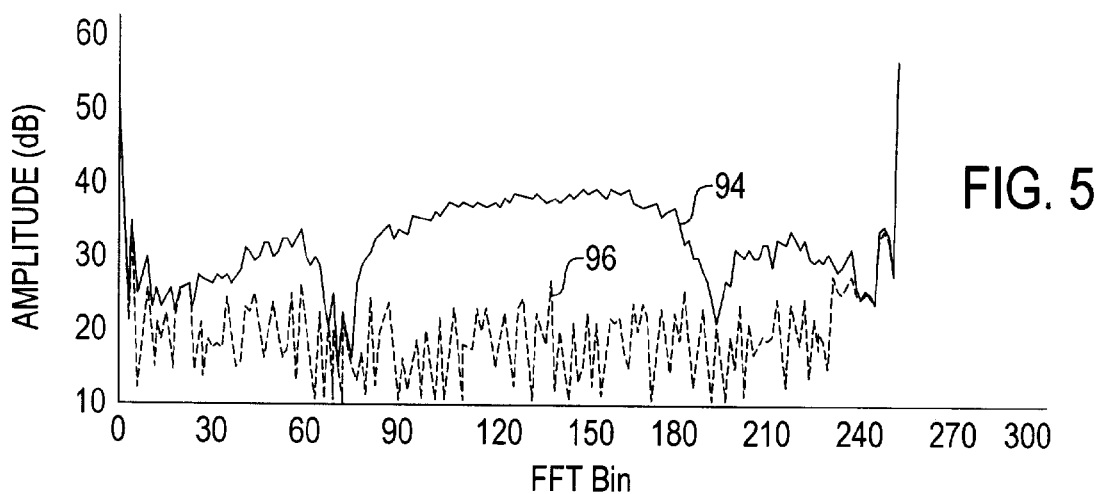
FIG. 5 graphically depicts the performance of the signal processing technique of FIG. 4.

FIG. 5 depicts a data array after fast fourier transformation, where the data is subject to system-to-system interference, but no target is present. Without the interference rejection method of this invention, the noise level is very high, as indicated by the solid trace 94. However, when the interference rejection method of this invention is enabled, the noise level is significantly reduced, as indicated by the broken trace 96. As indicated above, the high noise levels due to system-to-system interference can result in loss of target information, and increased likelihood of false alarms. However, with the improved signal-to-noise ratio afforded by the interference rejection method of this invention, targets can be more reliably identified and recognized.

In summary, this invention provides a simple and cost effective method of rejecting system-to-system interference in a FLR system with only minimal distortion of the data corresponding to the energy reflected by legitimate scatterers in the field of vision. While this invention has been described in reference to the illustrated embodiment, it is expected that various modifications in addition to those suggested above will occur to those skilled in the art. For example, the method equally applies to both fixed and scanned systems, and both CW and FMCW or other systems. In this regard, it will be understood that the scope of this invention is not limited to the illustrated embodiment, and that systems incorporating these and other modifications may fall within the scope of this invention, which is defined by the appended claims.

What is claimed is:

1. A method of interference rejection in a motor vehicle system having a forward looking radar sensor that is subject to possible interference from other radar systems, the method comprising the steps of:

successively sampling output data of said radar sensor and storing the samples in a data array;

computing a variance of said samples;

associating said samples with a transient due to interference when the computed variance exceeds a threshold;

bounding a subset of said array including said associated samples;

creating a replacement set of data samples; and replacing the bounded subset with the replacement set of data samples.

2. The method of claim 1, wherein N samples are stored in said data array, and the steps of sampling, computing and associating include the steps of:

storing M successive samples in the data array, where M<N, computing a mean $\mu$ of the of said M samples;

computing a variance S of said M samples from the computed mean $\mu$; and associating said M samples with a transient due to interference when the computed variance S of said M samples exceeds a threshold.

3. The method of claim 2, wherein the variance S is computed in accordance with the expression:

$$S = 1 \Big/ (M-1) \left[ \sum_{i=1}^{M} (X_i - \mu)^2 \right]$$

where $X_i$ is an individual sample.

4. The method of claim 1, wherein the bounded subset of said array includes a predetermined number of data samples prior to and after said associated samples.

5. The method of claim 1, wherein the step of creating a replacement set of data samples includes the steps of:

identifying first and second data samples taken respectively prior to and after said bounded subset of samples; and linearly interpolating between said first and second data samples to create said replacement set of data samples.

6. The method of claim 5, including the steps of:

determining a change in value between said first and second samples;

computing a data slope based on a ratio of said determined change to a dimension of said bounded subset of samples; and creating the replacement set of data by linear interpolation based on said computed data slope.

* * * * *